(12) United States Patent
Sebire et al.

(10) Patent No.: US 11,395,210 B2
(45) Date of Patent: Jul. 19, 2022

(54) METHOD, APPARATUS, COMPUTER PROGRAM PRODUCT AND COMPUTER PROGRAM

(71) Applicant: NOKIA TECHNOLOGIES OY, Espoo (FI)

(72) Inventors: Benoist Sebire, Tokyo (JP); Chunli Wu, Beijing (CN); Samuli Turtinen, Ii (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 32 days.

(21) Appl. No.: 16/763,354

(22) PCT Filed: Nov. 16, 2017

(86) PCT No.: PCT/CN2017/111423
§ 371 (c)(1),
(2) Date: May 12, 2020

(87) PCT Pub. No.: WO2019/095230
PCT Pub. Date: May 23, 2019

(65) Prior Publication Data
US 2021/0176696 A1   Jun. 10, 2021

(51) Int. Cl.
*H04W 48/02*   (2009.01)
*H04W 48/12*   (2009.01)
*H04W 72/04*   (2009.01)
*H04W 72/10*   (2009.01)

(52) U.S. Cl.
CPC ........... *H04W 48/02* (2013.01); *H04W 48/12* (2013.01); *H04W 72/042* (2013.01); *H04W 72/10* (2013.01)

(58) Field of Classification Search
None
See application file for complete search history.

(56) References Cited

U.S. PATENT DOCUMENTS

| | | | | |
|---|---|---|---|---|
| 9,918,299 | B2* | 3/2018 | Wang | H04W 72/0406 |
| 10,554,279 | B2* | 2/2020 | Chang | H04B 7/0626 |
| 11,063,703 | B2* | 7/2021 | Yi | H04W 72/0446 |
| 2010/0227569 | A1 | 9/2010 | Bala et al. | |
| 2011/0170495 | A1* | 7/2011 | Earnshaw | H04L 5/001 370/329 |
| 2011/0274063 | A1 | 11/2011 | Li | |

(Continued)

FOREIGN PATENT DOCUMENTS

WO   WO 2016/187885 A1   12/2016

OTHER PUBLICATIONS

Extended European Search Report dated May 3, 2021 corresponding to European Patent Application No. 17932184.9.

(Continued)

*Primary Examiner* — Hong S Cho
(74) *Attorney, Agent, or Firm* — Squire Patton Boggs (US) LLP

(57) ABSTRACT

The embodiments of the disclosure present a method. The method comprises a step of receiving at a user device dynamic control information, said dynamic control information modifying one or more restrictions associated with uplink grant for one or more channels; and a step of using said modified restriction to control grant for one or more channels. An apparatus and a computer program thereof are also disclosed.

17 Claims, 6 Drawing Sheets

---

502 Receiving a radio resource control message, comprising one or more allowed logical channels for transmission 504 Receiving a dynamic control message 506 Apply restrictions in use in accordance with the received radio resource control message and dynamic control messages

500

(56) References Cited

U.S. PATENT DOCUMENTS

2012/0275400 A1    11/2012  Chen et al.
2016/0226632 A1     8/2016  Zhang et al.
2018/0270839 A1*    9/2018  Loehr ............... H04W 72/0446

OTHER PUBLICATIONS

Samsung, "Logical Channel Prioritization Considering Multiple Numerologies and/or TTIs," 3GPP Draft; R2-168040, 3GPP TSG RAN WG2 #96, Reno, USA, Nov. 4, 2016, XP051192336.
International Search Report and Written Opinion dated Jul. 30, 2018 corresponding to International Patent Application No. PCT/CN2017/111423.
Panasonic, "Semi-persistent Scheduling Operation in LTE Rel-9," R2-093849, 3GPP TSG RAN WG2 #66bis, Jul. 3, 2009.
First Office Action dated Mar. 30, 2022 corresponding to Chinese Patent Application No. 201780096938.X, with partial English summary thereof.

* cited by examiner 300 304 303 302 301

METHOD, APPARATUS, COMPUTER PROGRAM PRODUCT AND COMPUTER PROGRAM

FIELD OF THE INVENTION

Some embodiments relate to a method, an apparatus, a computer program product and a computer program.

BACKGROUND

A communication system can be seen as a facility that enables communication between two or more devices such as user terminals, machine-like terminals, base stations and/or other nodes by providing carriers between the communication devices. A communication system can be provided for example by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless system at least a part of communications between at least two stations occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename Wi-Fi (or Wi-Fi). Wi-Fi is often used synonymously with WLAN. The wireless systems can be divided into cells, and are therefore often referred to as cellular systems.

A user can access a communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

A communication system and associated devices typically operate in accordance with a given standard or specification which sets out what the various entities associated with the system are permitted to do and how that should be achieved. Communication protocols and/or parameters which shall be used for the connection are also typically defined. An example of standardized communication system architectures is the long-term evolution (LTE) of the Universal Mobile Telecommunications System (UMTS) radio-access technology. The LTE has been and is being standardized by the 3rd Generation Partnership Project (3GPP). The LTE employs the Evolved Universal Terrestrial Radio Access Network (E-UTRAN) access. Further development of LTE are sometimes referred to as LTE Advanced (LTE-A). The current 3GPP standardization effort is directed to what is termed as the 5th Generation (5G) system. The 5G system is sometimes referred to as NR (new radio).

SUMMARY

There is provided, in a first aspect, a method comprising: receiving at a user device dynamic control information, said dynamic control information modifying one or more restrictions associated with uplink grant for one or more channels; and using said modified restriction to control grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The method may further comprise receiving prior to said dynamic control information, restriction information for said one or more restrictions.

The dynamic control information may be provided by a lower signalling layer than the restriction information. It may be understood that signalling layers in this context may, for example, refer to layers of the Open Systems Interconnection model.

The method may further comprise receiving said restriction information in one or more radio resource control messages.

One or more restrictions may comprise one or more of a numerology and a transmission time interval.

The dynamic control information may be configured to modify one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

There is provided, in a second aspect, a method comprising: causing a base station to transmit dynamic control information, said dynamic control information modifying one or more restrictions associated with uplink grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The method may further comprise causing prior to said dynamic control information, transmission of restriction information for said one or more restrictions.

The dynamic control information may be provided by a lower signalling layer than the restriction information. It may be understood that signalling layers in this context may, for example, refer to layers of the Open Systems Interconnection model.

The method may further comprise causing said restriction information to be transmitted in one or more radio resource control messages.

One or more restrictions may comprise one or more of a numerology and a transmission time interval.

The dynamic control information may be configured to modify one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

There is provided, in a third aspect, an apparatus in a user device comprising at least one processor and at least one memory including a computer program code, the at least one memory and the computer program code configured to, with the at least one processor, cause the apparatus at least to: receive dynamic control information, said dynamic control information modifying one or more restrictions associated with uplink grant for one or more channels; and use said modified restriction to control grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The at least one memory and the computer program code may be configured to, with the at least one processor, to cause the apparatus to receive, prior to said dynamic control information, restriction information for said one or more restrictions.

The dynamic control information may be provided by a lower signalling layer than the restriction information. It may be understood that signalling layers in this context may, for example, refer to layers of the Open Systems Interconnection model.

The at least one memory and the computer program code may be configured to, with the at least one processor, to cause the apparatus to receive said restriction information in one or more radio resource control messages.

One or more restrictions may comprise one or more of a numerology and a transmission time interval.

The dynamic control information may be configured to modify one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

There is provided, in a fourth aspect, an apparatus in a base station comprising at least one processor and at least one memory including a computer program code, the at least one memory and the computer program code configured to, with the at least one processor, cause the apparatus at least to: cause transmitting of dynamic control information, said dynamic control information modifying one or more restrictions associated with uplink grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The at least one memory and the computer program code may be configured to, with the at least one processor, to cause the apparatus to cause transmitting, prior to said dynamic control information, of restriction information for said one or more restrictions.

The dynamic control information may be provided by a lower signalling layer than the restriction information. It may be understood that signalling layers in this context may, for example, refer to layers of the Open Systems Interconnection model.

The at least one memory and the computer program code may be configured to, with the at least one processor, to cause the apparatus to cause transmitting of said restriction information in one or more radio resource control messages.

One or more restrictions may comprise one or more of a numerology and a transmission time interval.

The dynamic control information may be configured to modify one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

There is provided, in a fifth aspect a computer program product for a computer, comprising software code portions for performing the steps of the method of the first aspect when said product is run on the computer.

There is provided, in a sixth aspect, a computer program product for a computer, comprising software code portions for performing the steps of the method of the second aspect when said product is run on the computer.

There is provided, in a seventh aspect, a computer program embodied on a non-transitory computer-readable storage medium, the computer program comprising program code for controlling a process to execute a process, the process comprising the steps of the method of the first aspect.

There is provided, in an eighth aspect, a computer program embodied on a non-transitory computer-readable storage medium, the computer program comprising program code for controlling a process to execute a process, the process comprising the steps of the method of the second aspect.

There is provided, in a ninth aspect, an apparatus in a user device comprising: means for receiving dynamic control information, said dynamic control information modifying one or more restrictions associated with uplink grant for one or more channels; and means for using said modified restriction to control grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The means may further cause the user device to receive, prior to said dynamic control information, restriction information for said one or more restrictions.

The dynamic control information may be provided by a lower signalling layer than the restriction information. It may be understood that signalling layers in this context may, for example, refer to layers of the Open Systems Interconnection model.

The receiving means may be or receiving said restriction information in one or more radio resource control messages.

One or more restrictions may comprise one or more of a numerology and a transmission time interval.

The dynamic control information may be configured to modify one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

There is provided, in a tenth aspect, an apparatus in a base station, comprising means for causing transmitting of dynamic control information, said dynamic control information modifying one or more restrictions associated with uplink grant for one or more channels.

The dynamic control information may be provided by at least one of: a MAC control element; downlink control information; and layer 1 signalling via a Physical Downlink Control Channel.

The dynamic control information may comprise information indicating if a respective one or more restrictions is to be applied.

The dynamic control information may be associated with said user device.

The dynamic control information may be associated with a respective channel.

The dynamic control information may comprise timing information to determine when said one or more restrictions are to be modified.

The dynamic control information may comprise one or more MAC control elements.

The causing means may be for causing transmission, prior to said dynamic control information, of restriction information for said one or more restrictions.

The dynamic control information may be provided by a lower signalling layer than the restriction information. It may be understood that signalling layers in this context may, for example, refer to layers of the Open Systems Interconnection model.

The causing means may be for causing transmission of said restriction information in one or more radio resource control messages.

One or more restrictions may comprise one or more of a numerology and a transmission time interval.

The dynamic control information may be for modifying one or more of said numerology and said transmission time interval.

The dynamic control information may be configured to modify one or more of said numerology and said transmission time interval for a respective channel.

At least one restriction may be dependent on a service.

The dynamic control information may be configured to remove one or more restrictions.

The dynamic control information may comprise a bitmap comprising a bit for each channel to indicate which channels are dynamically configured with the given dynamic control message.

The channels may comprise logical channels.

The dynamic control information may comprise at least one logical channel prioritisation restriction, wherein the at least one logical channel prioritisation restriction determines at least one of which numerology and which transmission time interval lengths are used for each logical channel.

A device and/or a communication system comprising an apparatus configured to provide at least one of the embodiments can also be provided. The device may comprise a communication device such as a user equipment or another node capable of wireless communication, or a network node.

Various other aspects and further embodiments are also described in the following detailed description of examples embodying the invention and in the attached claims.

BRIEF DESCRIPTION OF THE DRAWING

Some embodiments will now be described in further detail, by way of example only, with reference to the following examples and accompanying drawings, in which.

DETAILED DESCRIPTION OF THE DRAWINGS

Before explaining in detail embodiments, certain general principles of a communication system, a mobile communication device and a control apparatus are briefly explained with reference to FIGS. 1 to 3 to assist in understanding the technology underlying the described invention.

Figure 1:
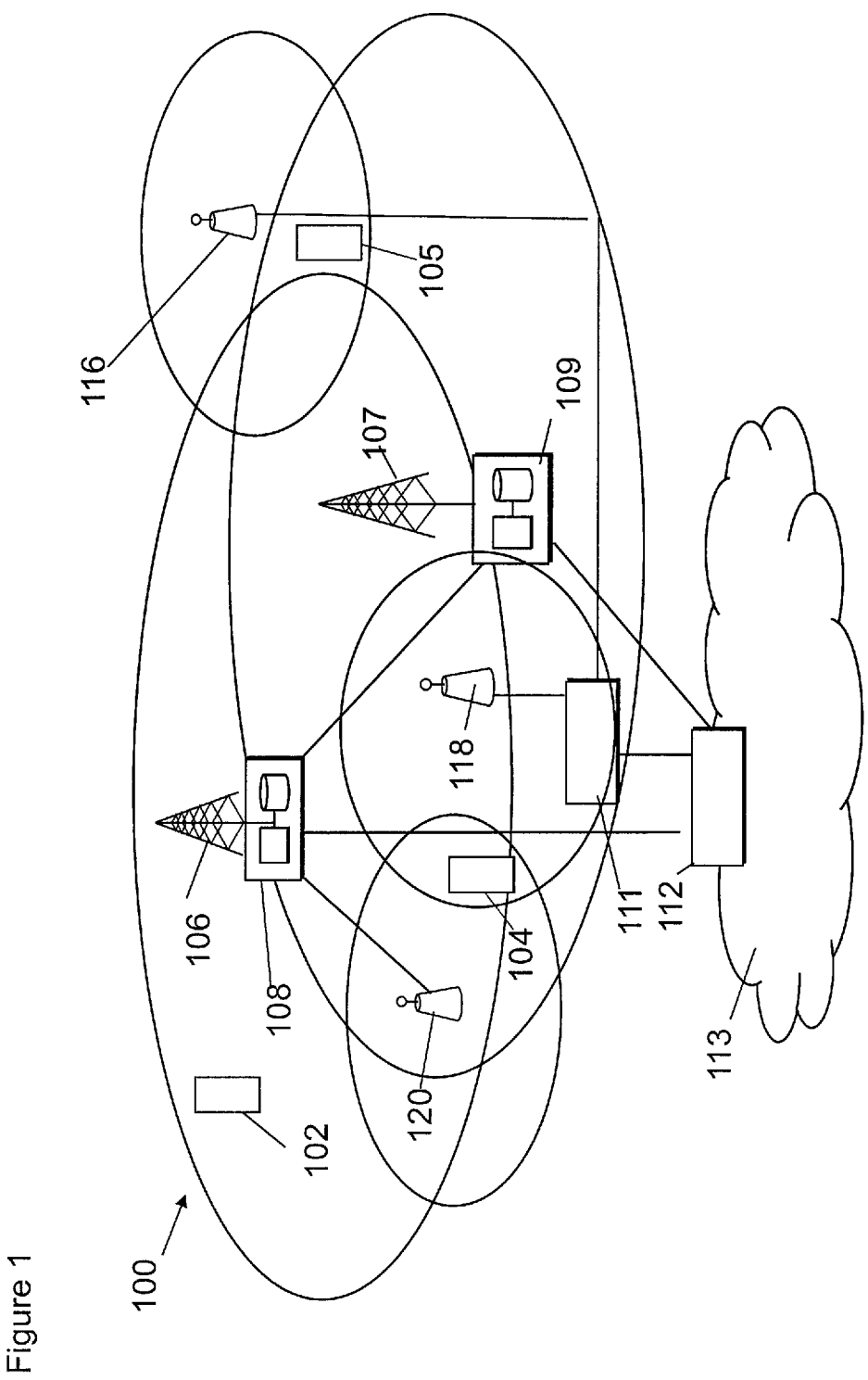
FIG. 1 illustrates a communication system.

In a wireless communication system 100, such as that shown in FIG. 1, wireless communication devices, for example, user equipment 102, 104, 105 are provided wireless access via at least one base station or similar wireless transmitting and/or receiving wireless infrastructure node or point. Such a node can be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access system comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided.

Figure 2:
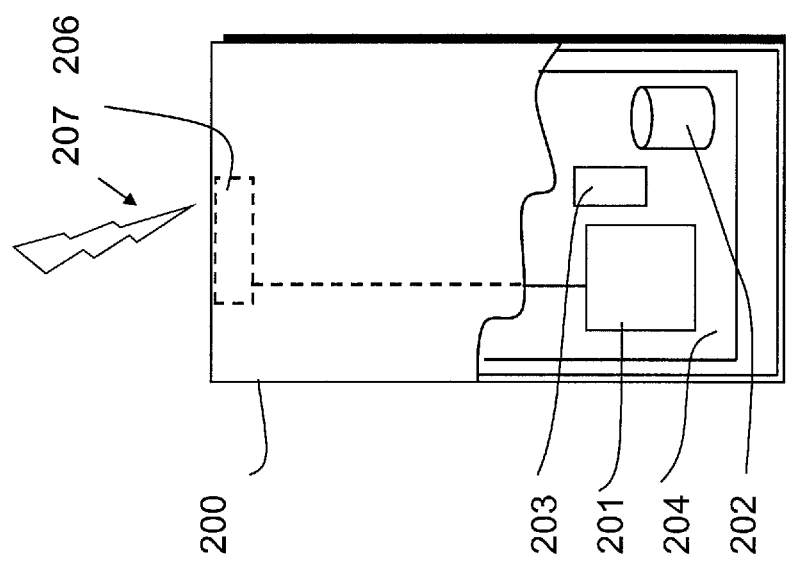
FIG. 2 illustrates a communication device.

A possible wireless communication device will now be described in more detail with reference to FIG. 2 showing a schematic, partially sectioned view of a communication device 200. Such a communication device is often referred to as an endpoint device. An appropriate communication device may be provided by any device capable of sending and receiving radio signals.

A communication device may be for example a mobile device, that is, a device not fixed to a particular location, or it may be a stationary device. The communication device may need human interaction for communication, or may not need human interaction for communication.

The communication device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the wireless device.

A communication device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. Furthermore, a wireless communication device may comprise appropriate connectors (either wired or wireless) to other devices and/or for connecting external accessories. The communication devices 102, 104, 105 may access the communication system based on various access techniques.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a communications system is the 5G concept. Network architecture in 5G may be similar to that of the LTE-advanced. Changes to the network architecture may depend on one or more of the need to support various radio technologies, the need for finer QoS (quality of service) support, and some on-demand requirements for e.g. QoS levels to support QoE (quality of experience) from the user point of view. Network aware services and applications, and service and application aware networks may bring changes to the architecture. The base stations in 5G may be referred to as gNB.

Some services proposed for 5G or NR services are, for example, enhanced mobile broadband (eMBB), massive machine-type-communications (mMTC), and ultra-reliable and low latency communications (URLLC).

Figure 3:
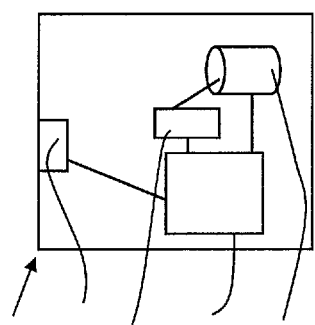
FIG. 3 illustrates a control apparatus.

FIG. 3 shows an example of a control apparatus 300. The control apparatus may be integrated in a gNB. The control apparatus 300 can be arranged to provide control on communications in a service area of the system. The control apparatus 300 comprises at least one memory 301, at least one data processing unit 302, 303 and an input/output interface 304. Via the interface the control apparatus 300 can be coupled to a receiver and a transmitter of the gNB. The receiver and/or the transmitter may be implemented as a radio front end or a remote radio head. For example the control apparatus 300 can be configured to execute an appropriate software code to provide the control functions.

Some of the following embodiments relate to dynamic control of the LCP (logical channel prioritisation) restrictions for numerology and/or TTI (transmission time interval) length mapping for a LCH in New Radio (NR). It may be understood that transmission time interval may alternatively be referred to as transmission duration. Numerology restrictions may refer to, for example, restrictions of subcarrier spacing used for granted transmission on an UL channel and/or a PUSCH (physical uplink shared channel). TTI length restrictions may refer to, for example, restrictions of granted transmission duration on an UL channel and/or a PUSCH. It may be understood that different numerologies may have different subcarrier spacings, and as such may have different TTI lengths. In some embodiments alternatively or additionally, it may be understood that the numerology and/or TTI length restrictions may apply to UL channels not currently in operation, wherein the restriction may come into effect if the UL channel is later operable. In some embodiments, restrictions may be applied to DL channels like PDSCH (Physical Downlink Shared Channel) or other channel types.

Figure 4:
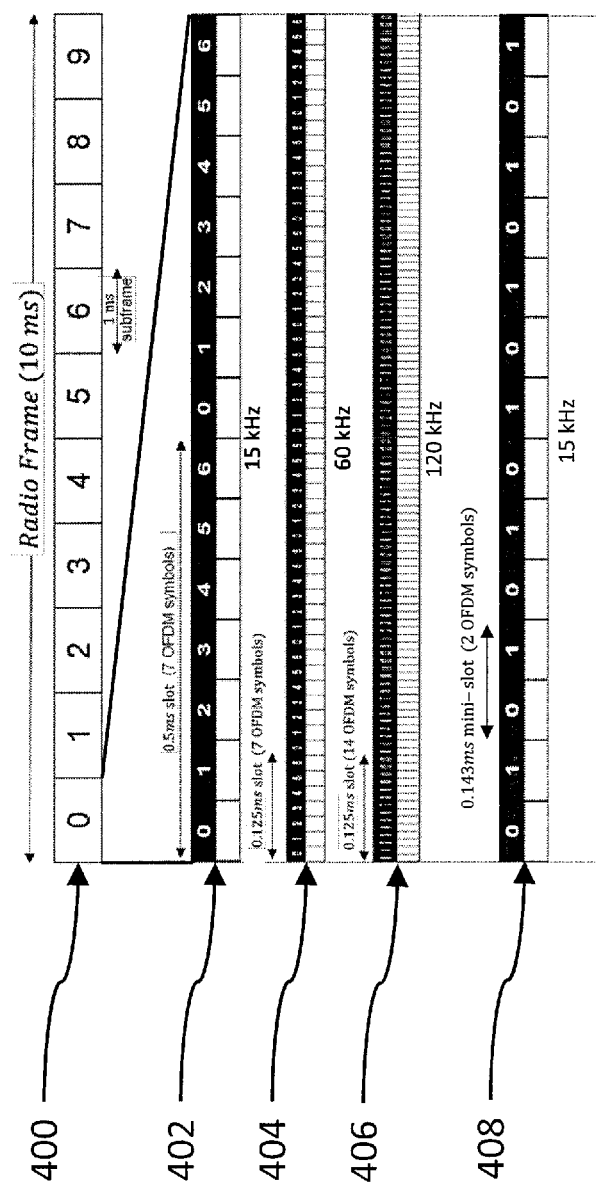
FIG. 4 depicts an example radio frame.

In the NR system, the physical layer is designed to support different numerologies. Different numerologies may have different subcarrier spacings as shown in FIG. 4. The physical layer of the NR system is also designed to support different TTI lengths with the same numerologies. To achieve the same numerology with different TTI lengths, slot sizes may be adjusted to meet the requirements of services or applications as required. It may be understood that mini-slots may be used, wherein the mini-slots are shorter than slots. For example, the UE may operate using the shortened TTI length of 0.2 ms to fulfill the ultra-low latency requirements of URLLC services. The TTI length could be relaxed to 1 ms for eMBB due to the relatively relaxed latency requirements. It may be understood that different TTI lengths may be achieved by applying different numerologies.

FIG. 4 depicts an example radio frame 400. By way of example, the radio frame depicts a 10 ms frame with 10 subframes numbered 0 to 9, each subframe having a 1 ms duration. It may be appreciated that subframes with different subcarrier spacings 402, 404, 406, 408, having different TTI lengths and, as such, they may have different numerologies. For example, subframes 402, 404, 406, and 408 have subcarrier spacings of 15 kHz, 60 kHz, 120 kHz and 15 kHz respectively. It may be understood that different numerologies have different TTI lengths per slot. It may also be understood that using a different number of orthogonal frequency division multiplexing (OFDM) symbols per TTI with the same numerology can also result in different TTI length. The gNB can configure which numerologies and TTI lengths may be used for each LCH (logical channel). This configuration may be referred to as an LCP restriction.

Numerology is discussed, for example, in technical document R2-1704504 which is entitled Visibility of numerology for NR Media Access Control (MAC) functions and is incorporated herein by reference.

From the perspective of a service, different numerologies and TTI lengths enable certain performance requirements to be met by the service. The service may be, for example, enhanced mobile broadband (eMBB), massive machine-type-communications (mMTC), ultra-reliable and low latency communications (URLLC). These services are by way of example only and there may be alternative and/or additional services. It may be understood that multiple services may operate on a single UE (user equipment). The restrictions may, for example, allow both services to be mapped on the same transport block, in this example, logical channel priorities in logical channel prioritisation (LCP) may determine how much data will be transmitted from each LCH or service in that transport block. In some embodiments, the MAC Control Element (MAC CE) may assist in managing the relationship between numerology and the service. It may be understood that the transport block may be mapped by MAC layer to an UL channel like PUSCH for transmission by L1 signalling.

A Logical Channel Prioritization procedure is applied when a new transmission is performed. Radio resource control (RRC) can control the scheduling of uplink (UL) data by giving each logical channel a priority where increasing priority values indicate lower priority levels. In addition, each logical channel may be given a Prioritized Bit Rate (PBR). Each logical channel may also be given a Bucket Size Duration (BSD).

A technique such as Logical Channel Prioritisation (LCP) may be implemented in the MAC layer to control how a user equipment (UE) multiplexes data onto a transport block in LTE. In LCP, a PBR (Prioritized Bit Rate) is configured per Logical Channel (LCH) to ensure higher priority LCHs are scheduled first while avoiding the starvation of lower priority ones. The PBR is used by the Token Bucket mechanisms in LCP.

It may be appreciated that in 5G New Radio uplink grant scheduling and uplink quality of service management may be implemented. Quality of service management may be a concern when data buffered for transmission in a user equipment is associated with radio bearers (for example, logical channels) with different quality of service requirements. For example, some radio bearers may have a high quality of service requirement (e.g. ultra-reliable low latency communication) whereas others radio bearer may have a low quality of service requirement (e.g. best effort communication).

In LTE, an eNodeB is indirectly responsible for uplink quality of service management. In order to fulfil this responsibility, the eNodeB receives information from a user equipment about the amount of data buffered for transmission. The user equipment typically reports to the eNodeB which radio bearers (logical channels) need uplink resources and an amount of resources they need using buffer status reports. The eNodeB can then allocate uplink resources to the user equipment based on quality of service requirements of the radio bearers (logical channels) and the buffer status reports.

If the user equipment is connected to a number of packet data networks (PDNs), say IP multimedia subsystem (IMS), Internet and a virtual private network (VPN), there may be radio bearers (logical channels) configured in addition to the radio resource control (RRC) signaling bearers. Keeping the eNodeB informed of the status of a large number of radio bearers may require a considerable signaling overhead. Consequently, the LTE standards include the concept of logical channel groups (LCGs). The separation of radio bearers (logical channels) into different logical channel groups groups is based largely on the quality of service characteristics of the radio bearers (logical channels). Radio bearers with the same quality of service characteristics may belong to the same logical channel group.

When the eNodeB allocates uplink resources to the user equipment, the uplink resources may be handled by the user equipment via a logical channel prioritization (LCP) function.

In NR, LCP may further be enhanced by the introduction of logical channel restrictions. Such logical channel restrictions are used to limit how logical channels use a grant depending on the numerology and transmission time interval (TTI) associated to that grant. For example, a low latency service would benefit from being transmitted with a "fast" grant (i.e. a grant associated with a numerology linked to a short TTI) and should not make use of "slow" grants (i.e. grants associated with a numerology linked to large TTI).

Numerology is discussed, for example, in technical document R2-1704397 which is entitled Logical channel prioritisation and multiple numerologies and is incorporated herein by reference. The document further discusses performing LCP and what the differences are compared to performing LCP in LTE.

It may be understood that representing numerology using only TTI duration when selecting which logical channels to include in the MAC PDU may be not be optimal. An issued associated with this is approach may be observed if, for example, more than one service is served the same TTI duration. That is to say, by way of example, there could be a case when eMBB logical channels and URLLC logical channels are served the same TTI duration, but the URLLC logical channels have an increased power relative to the eMBB logical channels to improve the reliability of the URLLC logical channels making it difficult to establish a difference between the services at the PHY level. It may be appreciated that this issue may be observed in cases where the same TTI duration is used by different services with one or more other properties being varied. The properties varied, by way of example, may be other physical layer properties.

The MAC has some form of awareness of the properties of the physical layer to be able to map certain logical channels with certain properties of the physical layer. The TTI length alone may not be sufficient to perform effective radio resource management (RRM) in some cases.

TTI length may be considered together with other numerology characteristics to uniquely indicate how to map a transmission on the physical layer resource. This information (e.g. TTI and numerology of an UL grant) may be derived from the resource allocation of the uplink grant. A grant with certain TTI length can represent different radio properties, when associated with different subcarrier spacing (SCS) values. For example, a mini-slot grant with the SCS 15 kHz is more robust towards delay spread than a grant with the same duration, associated with the SCS 60 kHz. In scenarios with large channel delay spread, it may be more suitable to transmit URLLC like services using grants with the SCS 15 kHz, than the ones with the SCS 60 kHz.

The restrictions described above may, for example, be implemented in NR. When the restrictions described above are in place, a low latency service will only be transmitted when a "fast" grant occurs and be postponed otherwise. In other words, even when a "slow" grant occurs, no data from the logical channel will be transmitted. This may become problematic in high load situation where the NR base station (gNB) may not have enough resources to allocate "fast grants" to all UEs.

The restrictions may be configured by the gNB. The restrictions may be set by the gNB and transmitted to the UE. The restrictions may, for example, be configured by the gNB via RRC configuration and transmitted to the UE via RRC signalling. The restrictions may be the mapping configuration for each LCH and determine the numerologies and TTI lengths that can be used for this LCH in accordance with the UL grant. It may be understood that in some embodiments, the restrictions may be dynamically controlled by, for example a MAC CE and/or DCI (Downlink Control Information). The MAC CE and/or DCI may, for example, apply the restrictions previously sent by RRC.

Another problematic scenario may be observed when numerology restrictions are configured for the UE. For example, numerology restrictions may stipulate that LCH1 is configured to use numerology1 and LCH2 is configured to use numerology2. LCH1 and LCH2 may be configured to use different frequency carriers, such as, low frequency which have smaller SCS and longer III length, and high frequency carriers which have larger SCS and shorter TTI length, respectively. If, for example, the high frequency carrier gets blocked by an obstacle, LCH2 cannot be mapped to a numerology1 grant without RRC reconfiguration. RRC reconfiguration may be time consuming and as such may take too long to fulfil configured Quality of Service (QoS) requirements for the service of LCH2. In this situation, the gNB may instead use a lower frequency for LCH2 with more conservative resource allocation which achieves the same latency as the higher frequency by requiring fewer HARQ (hybrid automatic repeat request) retransmissions. This option may require RRC signalling to remove the restriction to make numerology1 usable for LCH2. Furthermore, once the high frequency carrier is again un-blocked, it may require another RRC reconfiguration to restore the earlier configuration if the network (NW) so desires.

Some embodiments may make the restrictions dynamically controlled beyond RRC re-configurations. In some embodiments, a MAC CE may for example, be used to control the restrictions dynamically. The MAC CE may carry an ON/OFF signalling indicating ON/OFF of the restriction for the UE or per LCH for which such restrictions are configured. This may provide a mechanism to switch the restrictions on and off on the fly without RRC messages. In some embodiments, a DCI may be used to control the restrictions dynamically. The DCI sent via PDCCH (Physical Downlink Control Channel) may carry an UL grant and may carry an ON/OFF signalling indicating ON/OFF of the restrictions for the given UL grant.

Figure 5:
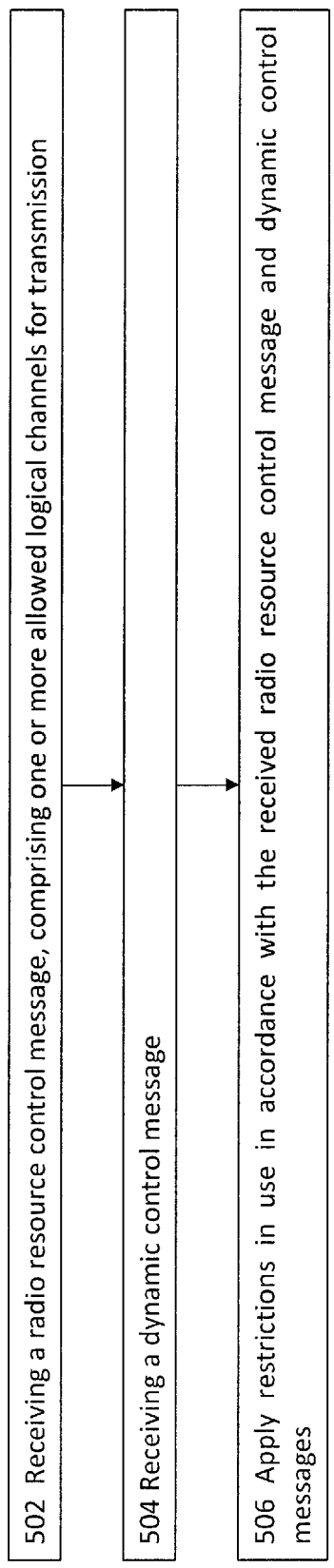
FIG. 5 illustrates a method in accordance with some embodiments.

FIG. 5 illustrates a diagram of a method performed by a user equipment. In step 502 the user equipment receives from the base station a radio resource control message. The radio resource control message may comprise one or more allowed logical channels for transmission. The radio resource control message may further comprise the mapping configuration for each allowable LCH and determine the numerologies and TTI lengths that can be used for this LCH. The radio resource control message may, for example, define one or more of subcarrier spacing, TTI length, and slot size.

In step 504, the user equipment may receive a dynamic control message. The dynamic control message may, for example, be a MAC control element. It may be understood that the dynamic control element may comprise timing information. The timing information may indicate a time when the restrictions are in force and/or a time when the restrictions are not in force. The timing information may alternatively or additionally comprise a counting duration, and the restrictions in force may be determined based on whether the duration has elapsed. It may be understood that timing information comprising a counting duration may be received by the user equipment via RRC configuration from the gNB. The dynamic control message may, for example, be used to control the counting duration elapsing.

A further dynamic control message may start, re-start or stop the counting duration elapsing. The restrictions in force may change in accordance with the restrictions specified in the restriction state signalling using the newly started or stopped timing state.

In step 506, the user equipment applies the restrictions in use in accordance with the received radio resource control message which may be modified by one or more received dynamic control messages. It may be understood that the restrictions in use are implemented using, for example, LCP.

Figure 6:
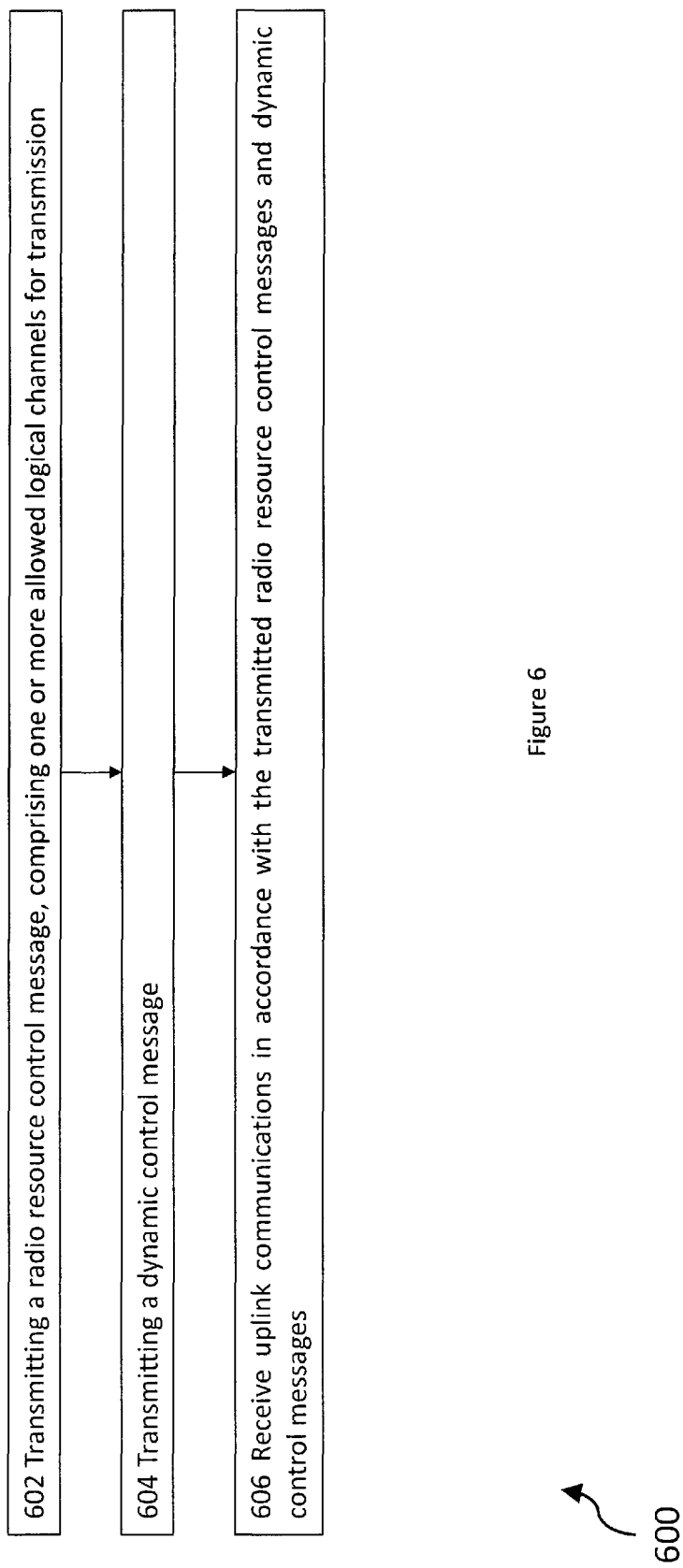
FIG. 6 illustrates a method in accordance with some embodiments.

FIG. 6 illustrates a diagram of a method performed by a base station. In step 602, the base station transmits a radio resource control message, comprising one or more allowed logical channels for transmission. The radio resource control message may comprise one or more allowed logical channels for transmission. The radio resource control message may further comprise the mapping configuration for each allowable LCH and determine the numerologies and TTI lengths that can be used for the respective LCH. The radio resource control message may, for example, define one or more of subcarrier spacing, TTI length, and slot size. It may be understood that the radio resource control message may comprise restriction information.

In step 604, the base station transmits a dynamic control message. The base station may transmit a dynamic control message to alter the resources in use quickly and effectively. It may be appreciated that the dynamic control information is provided by a lower signalling layer of the Open Systems Interconnection model than the radio resource control message. By way of example, the base station may transmit a dynamic control message in response to determining a high load or mobility. The dynamic control message may, for example, be a MAC control element or a Downlink Control Information message. It may be understood that the dynamic control element may comprise timing information. The timing information may indicate a time when the restrictions are in force or a time when the restrictions are not in force. The timing information may include a counting duration, and the restrictions in force may be determined based on whether the duration has elapsed. A further dynamic control message may start, re-start or stop the counting duration elapsing. The restrictions in force may change in accordance with the restrictions specified in the restriction state signalling using the newly started or stopped timing state.

In step 606, the base station will receive transmissions for the UE in accordance with the restrictions defined in the transmitted radio resource control message and dynamic control message.

Instead of ON/OFF control, the MAC CE may provide a timer based control. The value of the timer could be included as part of the MAC CE signalling or configured via RRC. For example, the RRC may configure the timer value, while receiving the MAC CE may start, re-start or stop the timer. It may be understood that the restrictions apply only when the timer is running. Alternatively, it may be understood that the restrictions apply only when the timer is not running.

The dynamic control of some embodiments could also apply to specific restrictions configured for a UE or a LCH, e.g., specific TTI length or numerology. For example, the numerology restriction could temporarily be lifted if the gNB intends to schedule a LCH via lower sub-carrier spacing (SCS) carrier after observing a problem with higher SCS carrier still ensuring the TTI length is kept within the configured limits. It may be appreciated that a Higher SCS offers advantages such as larger bandwidth and lower latency. A Lower SCS offers the advantage of being more robust, but may suffer with larger delays and lower bandwidth than the higher SCS carrier.

In another alternative, broadcast information is used to control the restrictions of all UEs with a specific RRC configuration. For example, broadcast information may be used to signal that the gNB is overloaded and could also enable or disable restrictions.

RRC may be used to configure which LCHs are or are not subject to the dynamic control via lower layer signalling. RRC may also configure for each LCH which restrictions are to be lifted via MAC signalling. For example, LCH1 may be restricted to use numerology1 and numerology2; RRC may be configured such that the restriction to numerology1 does not apply if dynamically disabled. In this way, the MAC signalling may be a MAC subheader with no actual content in the MAC CE.

MAC CE or DCI may also indicate a bitmap consisting a bit for each LCH to indicate which LCHs are dynamically configured with the given dynamic control message.

This configuration may allow the NW to ensure it can serve the high priority or latency sensitive data of a UE even in situations where it experiences high load or observes link degradation for the UE. Furthermore, in this configuration it may be understood that a temporary change in load or link condition may not require RRC reconfiguration.

It should be appreciated that embodiments may be implemented in the context of any suitable standard.

References have been made to a base station. It should be appreciated that one or more embodiments may be implemented by any suitable access node.

The embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptions may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. A method, comprising:
    receiving at a user device dynamic control information, said dynamic control information modifying one or more restrictions associated with uplink grant for one or more channels, wherein said one or more restrictions comprise at least one of a numerology or a transmission time interval; and
    using said modified restriction to control grant for one or more channels,
    wherein said channels comprise logical channels,
    wherein the dynamic control information comprises at least one logical channel prioritization restriction, and
    wherein the at least one logical channel prioritization restriction determines at least one of which numerology and which transmission time interval lengths are used for each logical channel.

2. The method as claimed in claim 1, wherein said dynamic control information is provided by at least one of a media access control control element; downlink control information; or layer 1 signalling via a physical downlink control channel.

3. The method as claimed in claim 1, wherein said dynamic control information comprises information indicating if a respective one or more restrictions is to be applied.

4. The method as claimed in claim 1, wherein said dynamic control information is associated with said user device.

5. The method as claimed in claim 1, where said dynamic control information is associated with a respective channel.

6. The method as claimed in claim 1, wherein said dynamic control information comprises timing information to determine when said one or more restrictions are to be modified.

7. The method as claimed in claim 1, further comprising receiving, prior to said dynamic control information, restriction information for said one or more restrictions.

8. The method as claimed in claim 7, wherein the dynamic control information is provided by a lower signalling layer than the restriction information.

9. The method as claimed in claim 7, comprising receiving said restriction information in one or more radio resource control messages.

10. The method as claimed in claim 1, wherein said dynamic control information is configured to modify one or more of said numerology and said transmission time interval for a respective channel.

11. The method as claimed in claim 1, wherein at least one restriction is dependent on a service.

12. The method as claimed in claim 1, wherein said dynamic control information is configured to remove one or more restrictions.

13. The method as claimed in claim 1, wherein the dynamic control information comprises a bitmap comprising a bit for each channel to indicate which channels are dynamically configured with the given dynamic control message.

14. A method, comprising:
    causing a base station to transmit dynamic control information, said dynamic control information modifying one or more restrictions associated with uplink grant for one or more channels, wherein said one or more restrictions comprise at least one of a numerology or a transmission time interval,
    wherein said channels comprise logical channels,
    wherein the dynamic control information comprises at least one logical channel prioritization restriction, and
    wherein the at least one logical channel prioritization restriction determines at least one of which numerology and which transmission time interval lengths are used for each logical channel.

15. An apparatus in a user device comprising:
    at least one processor; and
    at least one memory including a computer program code;
    the at least one memory and the computer program code configured to, with the at least one processor, cause the apparatus at least to:
    receive dynamic control information, said dynamic control information modifying one or more restrictions associated with uplink grant for one or more channels, wherein said one or more restrictions comprise at least one of a numerology or a transmission time interval; and
    use said modified restriction to control grant for one or more channels,
    wherein said channels comprise logical channels,
    wherein the dynamic control information comprises at least one logical channel prioritization restriction, and wherein the at least one logical channel prioritization restriction determines at least one of which numerology and which transmission time interval lengths are used for each logical channel.

16. An apparatus in a base station comprising:
at least one processor; and
at least one memory including a computer program code;
the at least one memory and the computer program code configured to, with the at least one processor, cause the apparatus at least to:
cause transmitting of dynamic control information, said dynamic control information modifying one or more restrictions associated with uplink grant for one or more channels, wherein said one or more restrictions comprise at least one of a numerology or a transmission time interval,
wherein said channels comprise logical channels,
wherein the dynamic control information comprises at least one logical channel prioritization restriction, and
wherein the at least one logical channel prioritization restriction determines at least one of which numerology and which transmission time interval lengths are used for each logical channel.

17. A non-transitory computer-readable medium encoded with a computer program, said computer program comprising software code portions for performing the method of claim 1 when said computer program is run on a processor.

* * * * *